United States Patent

Bachmann

[15] 3,707,162
[45] Dec. 26, 1972

[54] LOGIC CONTROL VALVE

[72] Inventor: Wilhelm Bachmann, Godshorn, Germany

[73] Assignee: Westinghouse Bremsen-und Apparatebau, GmbH, Hannover, Germany

[22] Filed: April 8, 1971

[21] Appl. No.: 132,383

[30] Foreign Application Priority Data

April 23, 1970 Germany..................P 20 19 650.3

[52] U.S. Cl............................................137/269
[51] Int. Cl.............................................F16k 11/02
[58] Field of Search..........137/269, 271, 625.27, 608, 137/625.66, 625.6, 625.65, 329, 329.01, 329.05; 251/359

[56] References Cited

UNITED STATES PATENTS

| | | | |
|---|---|---|---|
| 2,005,954 | 6/1935 | Petersen et al. | 251/359 X |
| 2,829,674 | 4/1958 | Segelhorst et al. | 137/504 X |
| 3,415,284 | 12/1968 | Stampfli | 137/625.66 |
| 3,463,442 | 8/1969 | Leskiewicz et al. | 137/625.66 X |
| 3,601,155 | 8/1971 | Brown | 137/625.66 |
| 3,604,460 | 9/1971 | Delove | 137/269 X |
| 3,646,969 | 3/1972 | Stampfli | 137/625.66 X |

*Primary Examiner*—Henry T. Klinksiek
*Assistant Examiner*—Robert J. Miller
*Attorney*—Ralph W. McIntire, Sr.

[57] ABSTRACT

A fluid logic valve device of the type having a fluid pressure supply port, an exhaust port, and an operating diaphragm member selectively subjectable to a control pressure, whereby the valve device may be employed wither as an AND device or as a NOT device by interchanging the fluid pressure supply and exhaust connections relative to said ports, and wherein the improvement comprises a pair of coplanar, concentrically arranged annular valve seats of different diameters and with which respective interchangeable valve elements are used to provide a high ratio of control pressure area to supply pressure area, for both the AND and NOT functions, and therefore insure positive, quick action of the device.

9 Claims, 3 Drawing Figures

PATENTED DEC 26 1972 3,707,162

INVENTOR.
WILHELM BACHMANN
BY Ralph W. McIntire, Jr.
ATTORNEY

LOGIC CONTROL VALVE

BACKGROUND OF THE INVENTION

As is well known to those skilled in the art relating to fluid pressure operable logic valve devices, an AND device is one having two or more inlets all of which must be charged with fluid pressure simultaneously to produce an output at the outlet port, whereas a NOT device is one having a control port or inlet which functions to effect an output at the outlet when the control port is void of fluid pressure. The invention herein disclosed, as above noted, concerns a logic valve device which, with certain modifications, may be used in conventional manner, either as an AND device or as a NOT device for controlling automatic machinery and drive systems therefor. A desirable characteristic of a logic valve device used for such purpose is that it responds positively and quickly to a control impulse.

Although it is possible to convert an AND device to a NOT device simply by interchanging the supply and exhaust connections, this does not necessarily insure that the device, when used as a NOT device, will react positively and sharply to a control impulse, or vice versa. For example, in one type of logic valve device, when a diaphragm provided therein for operating a valve member is subject on one side, usually comprising a relatively large effective pressure area, to control pressure supplied via a control port, an output is effected at the outlet when the device is employed as an AND device. When the device is employed as a NOT device, however, said device, in well-known manner, responds to a control pressure supplied via the control port, to effect termination of output at the outlet. Supply pressure provided via an inlet port normally acts in opposition to control pressure acting on the relatively large pressure area on the one side of the diaphragm and, in the case of the AND device, such supply pressure usually acts on a relatively small pressure area of the valve member as compared to said large pressure area of the diaphragm, so that a high differential ratio between the effects of the opposing pressures is obtained to insure positive, fast action of the valve device. When the AND device is converted to a NOT device, however, as above explained, the supply pressure, instead of acting on the small pressure area of the valve member, is diverted to and acts on the opposite side of the diaphragm which is somewhat larger than said small pressure area of the valve member, thus resulting in a reduction of the differential ratio between the opposing supply and control pressures, which is not desirable in that the positive, rapid response of the device is correspondingly reduced.

SUMMARY OF THE INVENTION

The object of the invention herein disclosed, therefore, is to provide a fluid pressure operable logic valve device characterized by means whereby the valve device is convertible for use either as an AND device or a NOT device while still retaining a high differential ratio between opposing control and supply pressure areas for insuring positive, quick action of the device.

Briefly, the invention comprises a fluid pressure operable logic valve device convertible for use either as an AND device or as a NOT device and including a diaphragm member to which one end of a valve operating member is secured for movement therewith, said valve operating member, in response to control pressure acting on a control pressure side of the diaphragm, being operable for effecting an output at an outlet port, in the case of the AND function, and to effect effect termination of output at the outlet, in the case of the NOT function. According to the invention, a coaxial bore formed in the housing and in which the valve operating member is reciprocably disposed, has formed at one end thereof, adjacent the operating diaphragm, a pair of coplanar, concentrically disposed annular valve seats, the smaller of which, in cooperation with a first annular valve member carried by the diaphragm on the side adjacent the one end of the valve operating member, acts as the exhaust valve when the device is used as an AND device, while the larger valve seat, in cooperation with an annular valve member, larger than and interchangeable with the first annular valve member and carried by the diaphragm, acts as the supply valve when the device is used as a NOT device. The larger valve seat and valve element, in effect, reduces the effective pressure area of the diaphragm on the valve side or the side opposite the control pressure side. Thus, such reduction of the pressure area on the valve side of the diaphragm results in maintaining the relatively high differential pressure area ratio, notwithstanding that supply pressure, which normally acts, when the valve device is used as an AND device, on a relatively small pressure area comprising the end of the supply-exhaust valve member opposite that adjacent the diaphragm, is diverted to act on said valve side of the diaphragm when the valve device is used as a NOT device.

DESCRIPTION AND OPERATION

Figure 2:
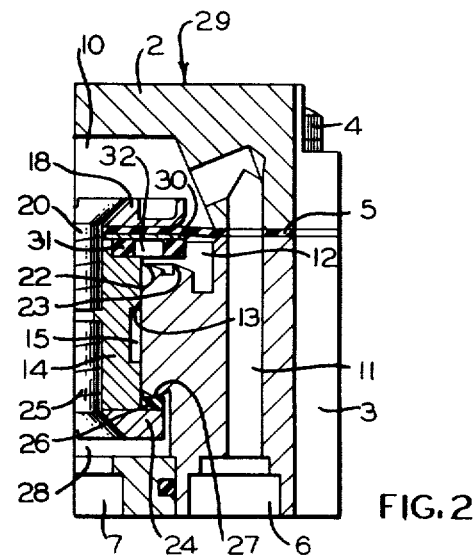
FIG. 2 is a sectional view taken along line III—III of FIG. 1, as viewed in the direction indicated by the arrows, showing the logic valve device as an AND device.

As shown in FIG. 2, a fluid pressure operable logic valve device 1 comprising an AND device (above defined) includes an upper housing section 2 clamped to a lower housing section 3 by suitable means such as a plurality of bolts 4 with a diaphragm member 5 peripherally and sealingly secured therebetween.

Figure 3:
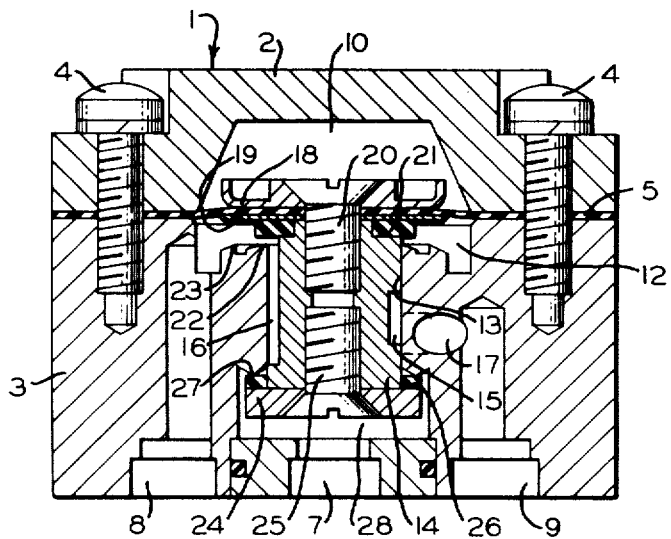
FIG. 3 is a sectional view taken along line II—II of FIG. 1, as viewed in the direction indicated by the arrows, of the logic valve device modified as a NOT device.

The lower housing section 3 has formed therein a control port 6, which does not appear in FIG. 2, but may be seen in FIG. 3 of the drawing. The lower housing section 3, as shown in the AND device in FIG. 2, is further provided with a fluid pressure supply port or inlet 7, an exhaust or atmospheric port 8, and a delivery port or outlet 9. Since all these ports open to a common surface, that is, the bottom surface of the valve device, as shown in FIG. 2, said valve device is conveniently adaptable for mounting on a control panel (not shown) to which fluid pressure conduits (not shown) may be conveniently connected.

The upper housing section 2 cooperates with diaphragm 5 to form a control chamber 10 connected to control port 6 via a passageway 11 formed partly in said upper housing section and partly in the lower housing section 3, said diaphragm having an aperture formed therein and situated such as to register with said passageway to permit communication therethrough between the two portions thereof formed in the two housing sections, respectively. The diaphragm 5 separates the control chamber 10 adjacent the one side thereof from an annular chamber 12 formed adjacent the opposite side of said diaphragm in the lower housing section 3. Lower housing section 3 is also provided with a coaxial bore 13 opening at one end to annular chamber 12 and in which a valve operating member 14 is axially slidably disposed. The valve operating member 14 has an annular groove 15 surrounding the outer periphery thereof and communicating with a longitudinal channel 16 formed on the outer surface of said valve operating member and open to the bore 13. Groove 15 is connected with delivery port 9 via a connection passageway 17 formed in lower housing section 3.

As viewed in FIG. 2 of the drawing, the upper end of the valve operating member 14 is secured to diaphragm 5 for movement therewith by having said diaphragm clamped between a clamping plate 18 on the side adjacent control chamber 10 and a valve plate 19 adjacent annular chamber 12, all of which are secured concentrically in assembled relation by a screw 20. An annular exhaust valve element 21 is secured to valve plate 19 as by vulcanization, for example, and is adapted for seating on the smaller of two annular coplanar valve seats 22 and 23 formed in concentric relation to each other and surrounding the adjacent end of bore 13 in lower housing section 3. The lower end of valve operating member 14 has a valve plate member 24 concentrically secured thereby by a screw 25, said valve plate having a valve element 26 secured thereto and adapted for seating on an annular valve seat 27 surrounding the adjacent end of bore 13 opening into a chamber 28 into which inlet 7 opens. Valve element 26 and valve seat 27 cooperate to function as inlet valve means in the AND device and as exhaust valve means in a NOT device 29 shown in FIG. 3.

Outlet port 9, as above noted, is connected via connecting passageway 17 and annular groove 15 to channel 16 which, as hereinafter hereinafter be described, may be communicated with either port 7 or port 8. In the AND valve device 1 shown in FIG. 2, ports 7 and 8 are connected as supply and exhaust ports, and, therefore, chambers 28 and 12 act as supply and atmospheric chambers, respectively. On the other hand, in the NOT valve device 29 shown in FIG. 3, ports 7 and 8 are connected as exhaust and supply ports, and, therefore, chambers 28 and 12 act as atmospheric and supply chambers, respectively. Aside from the fact that the supply and exhaust connections are reversed with respect to the ports 7 and 8, the NOT device 29 differs structurally from the AND device 1 only in the respect that said NOT device is provided with a valve plate 30 interchangeable with valve plate 19 in the AND device 1, said valve plate 30 having secured thereto a valve element 31 of such diametrical dimension as to be seatable on the larger or outer valve seat 23 for the purpose to be later explained.

In considering the operation of the AND device 1 shown in FIG. 2, it will be assumed that supply port 7 is charged with fluid under pressure and that control port 6, and, therefore, control chamber 10, are void of fluid pressure, in which situation valve operating member 14 occupies an exhaust position in which it is shown and in which valve element 26 is in a seated position on valve seat 27 to cut off flow therepast of fluid pressure supply prevailing in chamber 28 from supply port 7, while valve element 21 is in an unseated position relative to valve seat 22 to permit outlet port 9 to be exhausted via passageway 17, groove 15, channel 16, annular chamber 12, and exhaust port 8.

When control chamber 10 is charged with fluid pressure via control port 6, diaphragm 5, in response to such pressure, causes downward movement of the valve operating member 14 to a supply position in which valve element 21 occupies a seated position on valve seat 22 to cut off communication of outlet port 9 with exhaust port 8, as above described, and valve element 26 is moved to an unseated position relative to valve seat 27 whereby fluid pressure from supply port 7 may flow via chamber 28, channel 16, groove 15, and passageway 17 to outlet 9. Movement of the valve operating member 14 to its supply position is positive and without delay due to the fact that the area of diaphragm 5 subjected to control pressure in control chamber 10 is much larger than the area of valve plate 24 subject to supply pressure in chamber 28. Moreover, such positive movement of the valve operating member 14 is also assured in that the area within valve element 27, once unseated and exposed to supply pressure, is greater than the area within valve element 21 exposed to said supply pressure. Sufficient reduction of control pressure in control chamber 10 effects, in well-known manner, restoration of the valve operating member 14 to its exhaust position in response to dominating pressure acting on the underside of valve plate 24 and on the area or underside of valve element 21 within valve seat 22.

Figure 1:
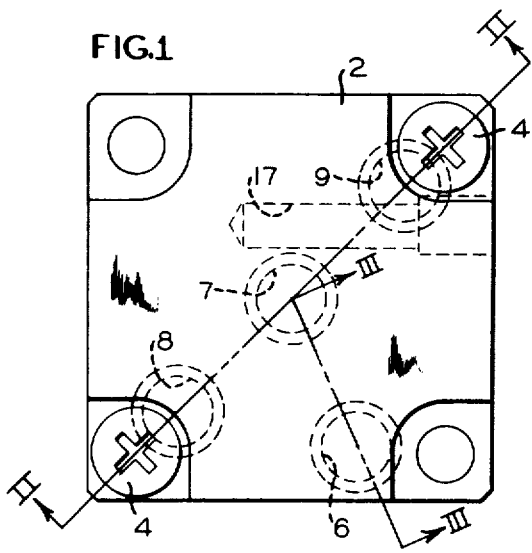
FIG. 1 is a horizontal view, in outline, of one end of a fluid pressure operable logic valve device embodying the invention.

In considering the operation of the NOT device 29 shown in FIG. 1, it will be recalled that port 7 in this case is the exhaust port and port 8 is connected to fluid pressure supply. As it appears in the drawing, the valve operating member 14 is shown in a supply position in which valve element 31 occupies an unseated position relative to outer valve seat 23 so that supply pressure in port 8 (see FIG. 2) and therefore in annular chamber 12 may flow past said unseated valve element to outlet 9 via channel 16, groove 15, and passageway 17, while valve element 26 occupies a seated position on valve seat 27 to prevent exhaust of fluid pressure via chamber 28 and port 7.

When control chamber 10 is charged via control port 6 and passageway 11 (see FIG. 3), such pressure acting over the larger area of diaphragm 5 in chamber 10, is compared to the smaller area in annular chamber 12 on which supply pressure acts, is effective for moving the valve operating member 14 downwardly to an exhaust position in which valve element 31 is moved to a seated position on valve seat 23 to cut off further supply of fluid pressure to outlet 9, and valve element 26 is unseated from valve seat 27 to effect exhausting of fluid pressure from outlet 9 via chamber 28 and port 7. A recess 32 formed in valve element 31 and communicating with bore 13 at all times prevents entrapment of fluid pressure between the concentric valve seats 22 and 23 when valve element 31 is seated on valve seat 23.

According to the invention and with the valve plate 30, which carries the valve element 31, installed in the NOT valve device 29, it should be noted that, when said valve element is seated on valve seat 23 and because of the larger area thus enclosed as compared to that enclosed by valve element 21 when seated on valve seat 22, the underside area of diaphragm 5 subjected to supply pressure in annular chamber 12 is effectively reduced. Thus, when control chamber 10 is charged with fluid pressure, the pressure differential across the two sides of the diaphragm 5 is effectively increased to thereby provide positive, fast action in moving the valve operating member 14 from its supply position to its exhaust position.

Having now described the invention, what I claim as new and desire to secure by Letters Patent, is:

1. A fluid logic valve device comprising:
   a. a housing having:
      i. a control pressure chamber,
      ii. an atmospheric chamber,
      iii. a fluid pressure inlet to which fluid pressure may be supplied, and
      iv. a fluid pressure outlet from which fluid pressure may be delivered;
   b. a resilient diaphragm member secured in said housing, said diaphragm member being subject on one side to control pressure in said control chamber and on the opposite side to opposing force of supply pressure supplied to said inlet;
   c. a valve operating member having one end secured to said diaphragm member on said opposite side thereof for movement with the diaphragm member and being reciprocably disposed in a bore formed coaxially in said housing;
   d. first valve means disposed partly on said one end of said valve operating member and partly on one end of said bore adjacent thereto;
   e. second valve means disposed partly on the opposite end of said valve operating member and partly on the opposite end of said bore adjacent thereto,
   f. said valve operating member being operable from a first position in which one of said first and second valve means cuts off communication between said outlet and said atmospheric chamber, and the other of said first and second valve means effects communication between said inlet and said outlet, to a second position in which said one of said first and second valve means effects communication between said outlet and said atmospheric chamber, and said other of said first and second valve means cuts off communication between said inlet and said outlet,
   g. said valve operator being operable to one of said first and second positions in response to the force of fluid pressure in the inlet acting on said opposite side of the diaphragm member, and being operable to the other of said first and second positions in response to said control pressure in the control chamber acting on said one side of the diaphragm;
   and wherein the improvement comprises
   h. means for varying the effective pressure area of said opposite side of said diaphragm member to provide a preselected pressure differential across the two sides thereof for effecting positive movement of the valve operating member from one to the other, and vice versa, of said first and second positions thereof.

2. A fluid logic valve device, as set forth in claim 1, further characterized by passage means formed on the peripheral surface of said valve operating member via which said outlet may be communicated through said bore to one of said inlet and said atmospheric chamber when said valve operating member is in the respective one of its said first and second positions.

3. A fluid logic valve device, as set forth in claim 2, wherein said means for varying the effective pressure area of said opposite side of the diaphragm member comprises:
   a. a pair of annular valve seats of different diametral dimensions concentrically formed at said one end of said bore, and
   b. interchangeable annular valve elements coinciding in dimension with the respective diametral dimensions of said annular valve seats, a preselected one of said valve elements being secured concentrically to said opposite side of said diaphragm member adjacent said one of the valve operating member to provide the desired effective pressure area on said opposite side of the diaphragm member when said valve element is seated on the diametrally corresponding valve seat.

4. A fluid logic valve device, as set forth in claim 3, wherein said annular valve seats are coplanar.

5. A fluid logic valve device, as set forth in claim 3, further characterized by a valve plate for mounting said annular valve element in surrounding relation to said one end of the valve operating member, said valve plate being removably and abuttingly secured between said one end of said valve operating member and said opposite side of the diaphragm member.

6. A fluid logic valve device, as set forth in claim 3, wherein the larger of said annular valve elements is provided with recess means extending over the smaller of said annular valve seats to prevent entrapment of fluid pressure in the space between the annular valve seats.

7. A fluid logic valve device, as set forth in claim 1, further characterized by a control port formed in said housing, via which control pressure may be supplied to said pressure control chamber, and an exhaust port via which said atmospheric chamber is vented to atmosphere, said fluid pressure inlet, fluid pressure outlet, control port and exhaust port each having a connecting end opening to a common external plane surface of the housing.

8. A fluid logic valve device, as set forth in claim 7, wherein said atmospheric chamber is disposed adjacent said opposite side of said diaphragm member with said one end of said bore opening thereto and with said first valve means controlling communication between said atmospheric chamber and said bore.

9. A fluid logic valve device, as set forth in claim 7, wherein said atmospheric chamber is disposed adjacent said opposite end of said valve operating member with said opposite end of said bore opening thereto and with said second valve means controlling communication between said atmospheric chamber and said bore.

* * * * *